(12) United States Patent
Tao

(10) Patent No.: US 11,203,085 B2
(45) Date of Patent: Dec. 21, 2021

(54) METHOD AND APPARATUS FOR LASER WELDING

(71) Applicant: GM Global Technology Operations LLC, Detroit, MI (US)

(72) Inventor: Wu Tao, Tianmen (CN)

(73) Assignee: GM Global Technology Operations LLC, Detroit, MI (US)

( * ) Notice: Subject to any disclaimer, the term of this patent is extended or adjusted under 35 U.S.C. 154(b) by 545 days.

(21) Appl. No.: 16/141,142

(22) Filed: Sep. 25, 2018

(65) Prior Publication Data
US 2020/0094351 A1 Mar. 26, 2020

(51) Int. Cl.
*B23K 26/00* (2014.01)
*B23K 26/06* (2014.01)
*B23K 26/32* (2014.01)
*B23K 26/26* (2014.01)

(52) U.S. Cl.
CPC .................................... *B23K 26/26* (2013.01)

(58) Field of Classification Search
CPC .......................... B23K 26/26; B23K 26/0604
See application file for complete search history.

(56) References Cited

U.S. PATENT DOCUMENTS

| | | | | |
|---|---|---|---|---|
| 3,860,784 A * | 1/1975 | Brown | ............... | B23K 26/0643 219/121.64 |
| 4,865,683 A * | 9/1989 | Burns | .................. | B23K 26/032 117/8 |
| 4,891,491 A * | 1/1990 | Duley | .................. | B23Q 35/128 219/121.63 |
| 5,272,309 A * | 12/1993 | Goruganthu | ....... | B23K 26/0604 219/121.63 |
| 6,646,225 B1 * | 11/2003 | Wang | .................. | B23K 26/0604 219/121.64 |
| 7,253,377 B2 * | 8/2007 | Wang | .................. | B23K 26/0604 219/137 R |
| 10,835,993 B2 * | 11/2020 | Matsuoka | .............. | B23K 26/21 |
| 2005/0194363 A1 * | 9/2005 | Hu | ..................... | B23K 26/0853 219/121.64 |

(Continued)

FOREIGN PATENT DOCUMENTS

| | | |
|---|---|---|
| CN | 101992350 A | 3/2011 |
| CN | 105555465 A | 5/2016 |

(Continued)

*Primary Examiner* — Robert J Utama
*Assistant Examiner* — Lawrence H Samuels
(74) *Attorney, Agent, or Firm* — Quinn IP Law

(57) ABSTRACT

A device and associated method for joining, via a laser welder, a first workpiece to a second workpiece is described. This includes arranging the first and second workpieces in a stack, including overlapping a portion of the first workpiece with a portion of the second workpiece. The laser welder generates a first laser beam and coincidentally controls the laser welder to traverse a desired weld path that is disposed on the top surface of the first workpiece. The laser devices generates a second laser beam and coincidentally controls the laser welder to traverse the desired weld path. Generating, via the laser welder, the first laser beam includes operating the laser welder at a pulsed operation and at a first power level. Generating, via the laser welder, the second laser beam includes operating the laser welder at a continuous operation and at a second power level.

18 Claims, 2 Drawing Sheets

(56) References Cited

U.S. PATENT DOCUMENTS

| | | | |
|---|---|---|---|
| 2011/0042361 A1* | 2/2011 | Nowak | B23P 6/007 |
| | | | 219/121.64 |
| 2012/0273470 A1* | 11/2012 | Zediker | B23K 26/14 |
| | | | 219/121.61 |
| 2015/0232369 A1* | 8/2015 | Marjanovic | B23K 26/0622 |
| | | | 428/192 |
| 2017/0120391 A1* | 5/2017 | Schmit | B23K 26/40 |
| 2017/0141374 A1* | 5/2017 | Nakai | B23K 26/28 |
| 2018/0214983 A1 | 8/2018 | Yang et al. | |
| 2018/0221989 A1* | 8/2018 | Matsuoka | B23K 26/082 |
| 2018/0243861 A1* | 8/2018 | Wang | B23K 26/322 |
| 2018/0245616 A1* | 8/2018 | Kumazawa | F16B 5/08 |

FOREIGN PATENT DOCUMENTS

| | | | |
|---|---|---|---|
| CN | 105899323 A | 8/2016 | |
| CN | 106715035 A | 5/2017 | |
| CN | 107530830 A | 1/2018 | |
| CN | 107848069 A | 3/2018 | |
| WO | 2017035728 A1 | 3/2017 | |

* cited by examiner

METHOD AND APPARATUS FOR LASER WELDING

INTRODUCTION

Laser welding is a joining process in which a laser beam is directed at a stack of metal workpieces to provide a concentrated energy source capable of generating a fusion weld joint between the overlapping metal workpieces. The laser beam increases the temperature in the metal workpieces to levels associated with a plasma state or a liquid state to effect the fusion welding. Laser welds may be in the form of conduction welding, transition/keyhole welding, and penetration/keyhole welding, depending upon the power density contained within a focus spot size that is being generated by the laser beam.

Layers of metal workpieces may be stacked and aligned relative to one another such that their faying surfaces overlap to establish a faying interface (or faying interfaces) within an intended weld site. A laser beam is then directed at or near a top surface of the workpiece stack. The heat generated from the absorption of energy that is supplied by the laser beam initiates melting of the metal workpieces and establishes a molten weld pool within the workpiece stack. The molten weld pool penetrates through the metal workpiece impinged upon by the laser beam and into the underlying metal workpiece or workpieces to a depth that intersects with the established faying interfaces.

The laser beam rapidly generates a molten weld pool upon impinging the top surface of the workpiece stack. After the molten weld pool is formed and stable, the laser beam is advanced along the top surface of the workpiece stack while tracking a predetermined weld path. Such advancement of the laser beam translates the molten weld pool along a corresponding course relative to the top surface of the workpiece stack and leaves behind molten workpiece material in the wake of the advancing weld pool that includes material from the layers of the metal workpieces in the workpiece stack. This penetrating molten workpiece material cools and solidifies to form a weld joint that is composed of re-solidified materials from all the layers of the metal workpieces. Such fusion of the material from the overlapping layers of the metal workpieces forms a weld joint.

When a laser beam strikes or impinges upon a top surface of a workpiece, portions of the incident laser beam may be reflected, absorbed or transmitted. The relative magnitudes of the portions of the incident laser beam being reflected, absorbed and transmitted are dependent upon the top surface conditions and material properties of the workpiece.

Heat from laser welding has been known to act upon layers of workpieces to distort the workpieces and generate localized material voids between the workpieces as a result of heat and vaporization. Localized material voids, which may be manifested as gaps between layers in the workpiece stack and/or as voids in one or more of the workpieces, may affect service life of the weld joint, and hence affect service life of the component that includes the weld joint. When the workpiece stack includes battery cell foils that are welded to a battery tab, the occurrence of localized material voids may affect electrical conductivity between one or more of the battery cell foils and the battery tab.

SUMMARY

A device and associated method for joining, via a laser welder, a first workpiece to a second workpiece is described, wherein the first and second workpieces are configured as sheets, and wherein the first workpiece includes a top surface and a bottom surface. The method includes arranging the first and second workpieces in a stack, including overlapping a portion of the first workpiece with a portion of the second workpiece. The laser welder generates a first laser beam and coincidentally is controlled to traverse a desired weld path that is disposed on the top surface of the first workpiece. The laser device generates a second laser beam and coincidentally controls the laser welder to traverse the desired weld path that is disposed on the top surface of the first workpiece. Generating, via the laser welder, the first laser beam includes operating the laser welder at a pulsed operation and at a first power level. Generating, via the laser welder, the second laser beam includes operating the laser welder at a continuous operation and at a second power level.

An aspect of the disclosure includes generating, via the laser welder, the first laser beam by controlling the first laser to have a focal point that is disposed beneath the top surface of the first workpiece.

Another aspect of the disclosure includes operating the laser welder at a duty cycle and a power level that are determined based upon a level of reflectivity of the top surface of the first workpiece.

An aspect of the disclosure includes operating the laser welder at a 50% duty cycle when the first workpiece is fabricated from copper.

Another aspect of the disclosure includes operating the laser welder at a duty cycle and a power level that are determined based upon a level of absorptivity of the top surface of the first workpiece.

Another aspect of the disclosure includes the second power level associated with the second laser beam being less than the first power level associated with the first laser beam.

Another aspect of the disclosure includes the second power level associated with the second laser beam being selected based upon a temperature that is associated with vaporization of the second workpiece.

Another aspect of the disclosure includes the second workpiece being a plurality of copper sheets disposed in a stacked arrangement, wherein the copper sheets comprise battery electrodes.

Another aspect of the disclosure includes the desired weld path being disposed on the top surface of the first workpiece and a weld path that includes the portion of the first workpiece being overlapped onto the portion of the second workpiece.

Another aspect of the disclosure includes applying a compressive load to the first and second workpieces prior to controlling the laser welder to traverse the desired weld path.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be employed to assist in describing the drawings. These and similar directional terms are illustrative, and are not to be construed to limit the scope of the disclosure. Furthermore, the disclosure, as illustrated and described herein, may be practiced in the absence of an element that is not specifically disclosed herein.

Figure 1:
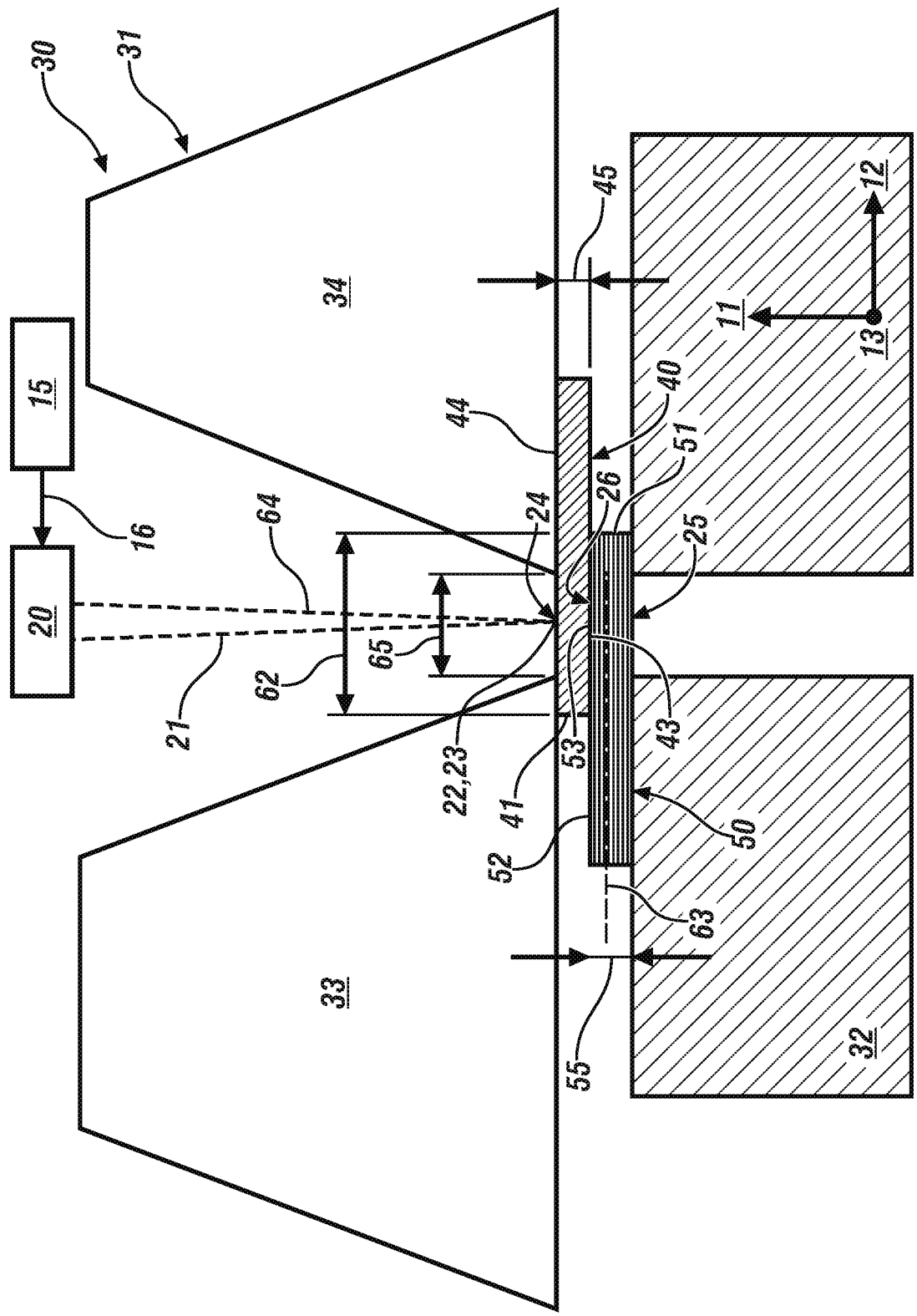
FIG. 1 schematically shows a side-view of an arrangement for welding a workpiece stack that includes a battery tab element and a plurality of stacked battery cell foil elements, in accordance with the disclosure.

Referring to the drawings, wherein like reference numerals correspond to like or similar components throughout the several Figures, FIG. 1, consistent with embodiments disclosed herein, schematically illustrate an embodiment of a laser welder 20 and associated welding system 30 that are configured to act on a workpiece stack 25 at a weld site 22 to generate a weld joint 26. Operation of the laser welder 20 is controlled by a controller 15, which generates a control signal 16 that is communicated to the laser welder 20 to effect operation. In this embodiment, the weld joint 26 is a butt joint since the ends of the elements of the workpiece stack 25 terminate at the weld joint 26. The laser welder 20 and associated welding system 30 are shown in context of a horizontal axis 12, a vertical axis 11, and a third axis 13 that projects orthogonal thereto.

In one embodiment, and as described herein, the workpiece stack 25 includes a first workpiece 40 that is disposed on top of a second workpiece 50 and arranged in a stacked configuration. The laser welder 20 may be operated to effect welding thereof to generate the weld joint 26 in one embodiment, wherein welding includes mechanically and electrically joining the first and second workpieces 40, 50 via a fusion process. In one non-limiting embodiment, the first workpiece 40 is configured as a battery tab and the second workpiece 50 is configured as a single battery cell foil that is to be welded to the first workpiece 40, wherein the laser welder 20 may be operated to effect the welding thereof. In one embodiment, the second workpiece 50 is configured as a plurality of stacked battery cell foils 50 having a total predefined thickness 55. The stacked battery cell foils 50 are to be welded to the first workpiece 40 by operation of the laser welder 20. Details related to operation of the laser welder 20 are described with reference to FIG. 2. The term "first workpiece 40" is employed interchangeably with the term "battery tab 40" throughout the specification. Likewise, the term "second workpiece 50" is employed interchangeably with the term "battery cell foils 50" throughout the specification.

The battery cell foils 50 are portions of electrodes of individual battery cells (not shown) that serve as anodes or cathodes for a respective battery cell in one embodiment. The battery cell foils 50 may be wholly or partly fabricated from copper, nickel, or nickel-coated copper in one embodiment, for example when configured as a cathode. Alternatively, the battery cell foils 50 may be wholly or partly fabricated from another material. In one embodiment, each of the battery cell foils 50 has a thickness that is between 0.005 millimeters and 0.02 millimeters. Each of the battery cell foils 50 is configured as a planar sheet that includes a first edge 51, a first, top surface 52, and a second, bottom surface 53. Each of the battery cell foils 50 includes a portion referred to as a faying surface, i.e., a surface portion that is part of the weld site 22. The one of the battery cell foils 50 that is adjacent to the battery tab 40 during welding includes faying surface portion, i.e., bottom surface 53, which is in contact with a corresponding faying surface portion 43 of the battery tab 40 when the workpiece stack 25 is formed.

The battery tab 40 is configured as a planar sheet including an edge 41, a first, bottom surface including a faying surface portion 43, and a second, top surface 44 that is opposite to the first bottom surface. The battery tab 40 may be wholly or partly fabricated from copper or aluminum in one embodiment. In one embodiment, battery tab 40 has a thickness 45 of 0.2 mm, and is fabricated from nickel-coated copper. The battery tab 40 may also have other features that are relevant to its mechanical, electrical and packaging functions within a battery assembly. During battery manufacturing and assembly, it is useful to mechanically and electrically join the battery tab 40 to the plurality of battery cell foils 50 to effect current transfer.

The workpiece stack 25 includes a stack that is composed of the battery tab 40 and a plurality of the battery cell foils 50, such as in a manner shown with reference to FIG. 1. In one embodiment, there are twenty of the battery cell foils 50 arranged in the workpiece stack 25. In this embodiment, the first edges 51 of the battery cell foils 50 are disposed in parallel and are arranged to abut a second plane 64 that is orthogonal to a first plane 63 that is defined by the plurality of stacked battery cell foils 50. Furthermore, the workpiece stack 25 includes the battery tab 40 being arranged in relation to the plurality of the battery cell foils 50 such that the battery tab 40 is positioned overtop of the plurality of battery cell foils 50 at a predefined overlap 62. The overlap 62 is that portion of the workpiece stack 25 between the edge 41 of the battery tab 40 and the first edges 51 of the battery cell foils 50. In one embodiment, the overlap 62 is in the order of magnitude of 3-4 mm in width as measured along the horizontal axis 12.

The laser welder 20 and associated welding system 30 act upon the workpiece stack 25 to advantageously mechanically and electrically join the battery cell foils 50 to the battery tab 40 via fusion. The laser welder 20 is a solid-state device that generates, focuses and directs a laser beam 21, including being advantageously disposed to direct the laser beam 21 at the top surface 44 of the battery tab 40 when the workpiece stack 25 is secured in the welding system 30. In one embodiment, the laser welder 20 may include a scanning optic laser head that is mounted to a robotic arm (not shown) to quickly and accurately carry the laser head to preselected weld sites on the workpiece stack 25 in response to programmed inputs. The laser beam 21 is a solid-state laser beam and, in particular, a fiber laser beam or a disk laser beam operating with a wavelength in the near-infrared range (commonly considered to be 700 nm to 1400 nm) of the electromagnetic spectrum. In one embodiment, the laser beam may be an optical fiber that has been doped with rare-earth elements (e.g., erbium, ytterbium, neodymium, dysprosium, praseodymium, thulium, etc.) or a semiconductor associated with a fiber resonator. Alternatively, a disk laser beam may be employed, which includes any laser beam in which the gain medium is a thin disk of ytterbium-doped yttrium-aluminum garnet crystal that is coated with a reflective surface and mounted to a heat sink. The laser beam 21 impinges on the top surface 44 of the workpiece stack 25 and imparts localized heat to effect fusion welding.

One fundamental property of a laser beam is its monochromatic nature (i.e., a single wavelength) and directionality, which result in minimal or narrow divergence of the beam. As such, a laser beam can be very sharply focused. A combination of a laser beam's high power density, intensity and narrow focus can cause melting or vaporization of material on which the laser beam 21 impinges. The laser beam 21 is directed by a beam generator of the laser welder 20 to processing optical devices via beam steering using a mirror or optical fiber technology. The processing optic concentrates the laser beam and focuses it, with focal lengths adjusted to the particular process.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets that may include calibrations and look-up tables. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The laser welder 20 is configured to move relative to the welding system 30, including traversing a desired weld path 24 that is disposed on a top surface 44 of the first workpiece 40, which is in parallel with the third axis 13 and orthogonal to the horizontal axis 12 and the vertical axis 11. The laser welder 20 is employed to generate a laser beam 21 that is applied to the top surface 44 of the workpiece stack 25 along the weld path 24 that is defined by linear travel between the first end 23 of the workpiece stack 25 and a second end (not shown) of the workpiece stack 25, in one embodiment. The laser beam 21 is directed at the top surface 44 of the battery tab 40 at a predetermined distance from the first edges 51 of the battery cell foils 50. The welding system 30 includes, in one embodiment, a mechanism 31 that is composed of an anvil 32, a first clamp 33 and a second clamp 34 that are advantageously arranged to apply compressive forces to the battery tab 40 and the plurality of the battery cell foils 50 to mechanically clamp and thus hold the workpiece stack 25 in position to effect fusion welding with the laser welder 20. A slot 65 is formed by the separation of the first and second clamps 33, 34, and is also in the anvil 32. The slot 65 is parallel to the desired weld path 24, and has a width in the horizontal direction that is on the order of magnitude of 2 mm. In one embodiment, and as shown, the battery tab 40 overlaps the plurality of battery cell foils 50 such that both the battery tab 40 and the plurality of battery cell foils 50 are clamped between the first clamp 33 and the anvil 32, and both the battery tab 40 and the plurality of battery cell foils 50 are clamped between the second clamp 34 and the anvil 32. Copper, from which the battery tab 40 may be fabricated, has physical properties that include a low absorptivity of a fiber laser beam, high thermal conductivity, and a low viscosity when in the molten state. One physical property of copper is that its surface absorptivity tends to increase after having been melted. Copper has a melting point of 1084 C, a boiling point of 2927 C, thermal conductivity on-vehicle 401 W/m-K, specific heat of 0.38 J/g-K, heat of fusion of 13.05 kJ/mol, and a heat of vaporization of 300.3 kJ/mol.

Figure 3:
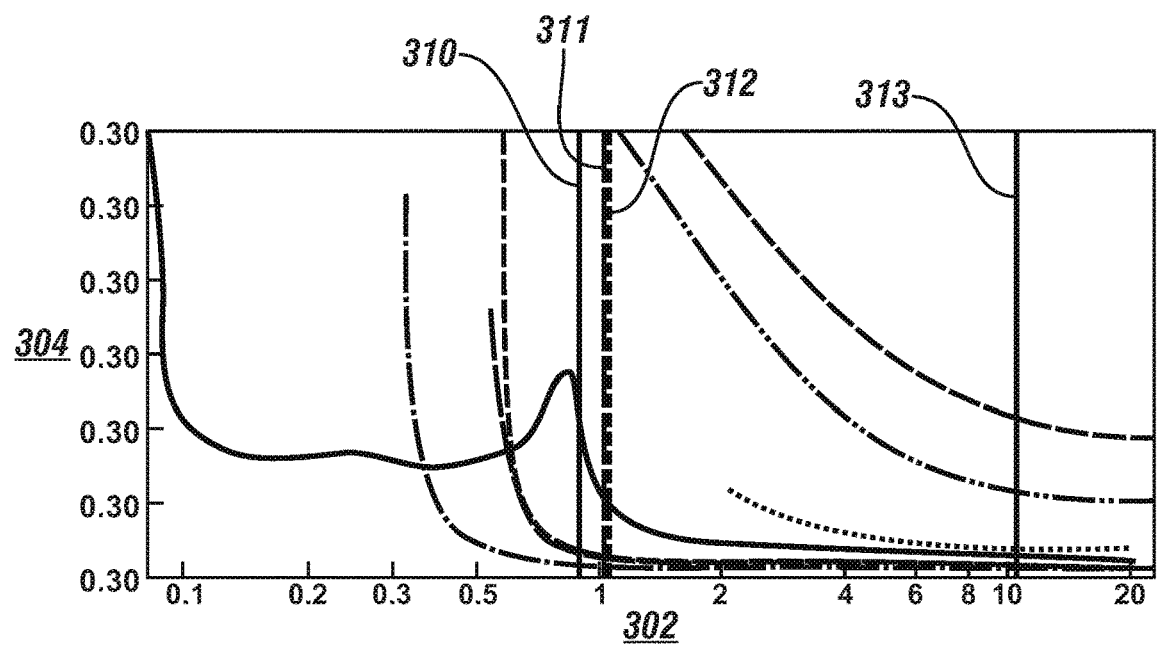
FIG. 3 graphically depicts absorptivity for a variety of materials in relation to wavelength (m), in accordance with the disclosure.

FIG. 3 graphically depicts magnitude of absorptivity, shown with reference to vertical axis 304, for a variety of materials in relation to wavelength (m), shown with reference to horizontal axis 302. This includes a wavelength associated with a direct-diode laser 310, a fiber laser 311, an Nd:YAG laser 312 and a CO2 laser 313. Materials include aluminum (Al), silver (Ag), gold (Au), copper (Cu), molybdenum (Mo) stainless steel, and mild steel. The absorptivity of copper is less than 0.05 at the wavelengths associated with the lasers that are listed, as shown.

Figure 2:
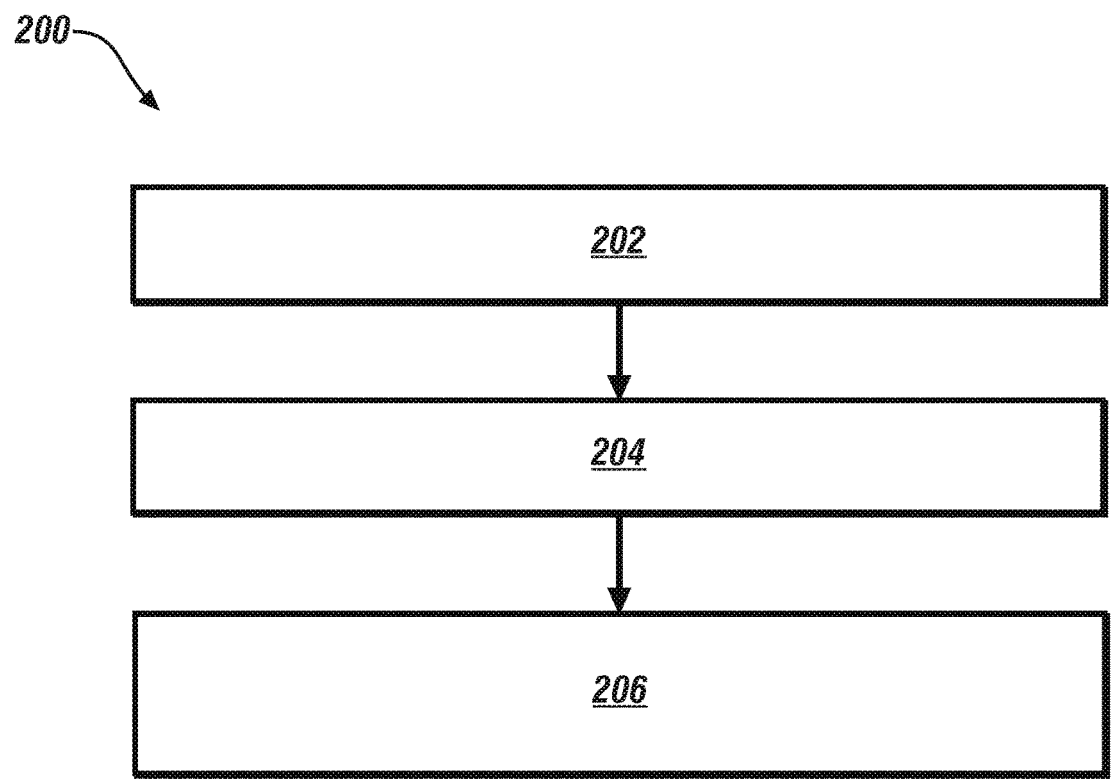
FIG. 2 schematically shows a welding process for joining a first workpiece to a second workpiece employing an embodiment of the laser welding system that is described with reference to FIG. 1, in accordance with the disclosure.

FIG. 2 schematically shows a welding process 200 for joining a first workpiece to a second workpiece employing an embodiment of the laser welding system 20 that is described with reference to FIG. 1. The welding process 200 includes, by way of a non-limiting example, joining the elements of the workpiece stack 25 that is described with reference to FIG. 1, which includes the battery tab 40 being stacked overtop of the plurality of battery cell foils 50 at the predefined overlap 62 and being clamped between the anvil 32 and each of the first and second clamps 33, 34 in a manner that includes formation of the slot 65.

The welding process 200 includes determining a magnitude of absorptivity of the portion of the workpiece stack 25 that is exposed to the laser beam 21 from the top surface 44 of the upper workpiece 40, i.e., the first workpiece in the form of the battery tab 40 (step 202). A finished copper surface has a very small absorptivity of fiber laser beams. However, a high laser power is required to conduct heat for welding the battery tab to foils, which may induce spatters and blowholes in the weld. Localized material voids, which may be manifested as gaps between layers in the workpiece stack and/or as voids in one or more of the workpieces may affect service life of the weld joint, and hence affect service life of the component that includes the weld joint.

Operation of the laser welder 20 is controlled to generate a first laser beam while coincidentally controlling the laser welder 20 to traverse the desired weld path 24 on the top surface 44 of the first workpiece 40 (step 204). Generating the first laser beam includes operating the laser welder 20 at a pulsed operation and at a first power level while coincidentally controlling the laser welder 20 to traverse the desired weld path 24 on the top surface 44 of the first workpiece 40. In one embodiment, the pulsed operation includes operating the laser welder 20 at a 50% ON/OFF duty cycle. In one embodiment, the pulsed operation includes operating the laser welder 20 at a laser power level of 4200 W at a duty cycle having a repetitively executed 0.5 ms ON time/0.5 ms OFF time. In one embodiment, the laser beam is controlled to a defocusing distance or focal point of −1.5 mm, i.e., a defocusing distance that is 1.5 mm below the top surface 44 of the first workpiece 40, with an attendant beam spot diameter of 0.6 mm. The example laser power levels and duty cycles stated herein may be selected specifically for use with copper, and may be adjusted based upon physical properties of the selected materials for the workpieces to be welded by the laser welder 20. The pulsed operation, including the laser power level and the duty cycle are illustrative examples that are selected based upon the magnitude of absorptivity of the top surface 44 of the first workpiece 40 that is exposed to the laser beam 21 to change its surface condition, specifically its absorptivity and/or its reflectivity.

Operation of the laser welder 20 is controlled to generate a second laser beam while coincidentally controlling the laser welder 20 to traverse the desired weld path 24 on the top surface 44 of the first workpiece 40 (step 206). Generating the second laser beam includes operating the laser welder 20 at a continuous operation and at a second power level while coincidentally controlling the laser welder 20 to traverse the desired weld path 24 on the top surface 44 of the first workpiece 40. The continuous operation includes operating the laser welder 20 at a 100% ON duty cycle. In one embodiment, the continuous operation includes operating the laser welder 20 at a laser power level of 3800 W at a 100% ON duty cycle. In one embodiment, the laser beam is controlled to a defocusing distance or focal point of −1.5 mm, i.e., a defocusing distance that is 1.5 mm below the top surface 44 of the first workpiece 40, with an attendant beam spot diameter of 0.6 mm.

The continuous operation, including the laser power level is an illustrative example that is selected based upon the physical properties of the first workpiece 40 and the second workpiece 50 that are exposed to heat from the laser beam 21 to change their states, specifically from solid state to molten or liquid state, with a restriction selected to avoid achieving a vaporization state, which may lead to generation of voids in the weld path 24. As such, the example laser power levels stated herein may be selected specifically for use with copper, and may be adjusted based upon physical properties of the selected materials for the workpieces to be welded by the laser welder 20. The continuous operation (step 206) is advantageously conducted with the laser beam 21 being at a power level that is lower than the power level associated with the pulsed operation (step 204).

When the workpiece stack includes a plurality of battery cell foils that are welded to a battery tab, the occurrence of localized material voids may affect electrical conductivity between one or more of the battery cell foils and the battery tab. The concepts described herein, including the arrangements of the workpiece stacks and the associated laser welding processes that includes the pre-welding step with pulsed laser power described herein can alter the surface condition of a copper tab to make it easier to absorb laser energy during a subsequent laser welding process and reduce occurrences of localized material voids and/or gaps, thus reducing part-to-part variability, achieving design-intent conductivity levels, and improving service life.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for joining, via a laser welder, a first workpiece to a second workpiece, wherein the first and second workpieces are configured as foils, and wherein the first workpiece includes a top surface and a bottom surface, the method comprising:
    arranging the first and second workpieces in a stack, including overlapping a portion of the first workpiece with a portion of the second workpiece;
    generating, via the laser welder, a first laser beam and coincidently controlling the laser welder to traverse a desired weld path that is disposed on the top of the first workpiece; and
    generating, via the laser welder, a second laser beam and coincidently controlling the laser welder to traverse the desired weld path that is disposed on the top surface of the first workpiece;
    wherein generating, via the laser welder, the first laser beam includes operating the laser welder at a pulsed operation and at a first power level, wherein the first power level is selected to change the first workpiece from a solid state to a molten state to change a level of reflectivity of the top surface of the first workpiece without vaporing the first workpiece;
    wherein operating the laser welder at a duty cycle and a power level to change the first workpiece from the solid state to the molten state to change the level of reflectivity of the top surface of the first metallic workpiece comprises operating the laser welder at a duty cycle and a power level that are determined based upon a level of absorptivity of the top surface of the first metallic workpiece; and
    wherein generating, via the laser welder, the second laser beam includes operating the laser welder at a continuous operation and at a second power level, wherein the second power level is selected to change the first and second workpieces to molten states.

2. The method of claim 1, wherein generating, via the laser welder, the first laser beam comprises controlling the first laser beam to have a focal point that is disposed beneath the top surface of the first workpiece.

3. The method of claim 1, wherein operating the laser welder at a duty cycle and a power level to change the first workpiece from the solid state to the molten state to change the reflectivity of the top surface of the first workpiece comprises operating the laser welder at a power of 4200 W and a 50% duty cycle when the first workpiece is fabricated from copper.

4. The method of claim 1, wherein operating the laser welder at a pulsed operation and at a first power level comprises operating the laser welder at a duty cycle and a power level that are sufficient to change a level of absorptivity of the top surface of the first workpiece without vaporing the first workpiece.

5. The method of claim 1, wherein the desired weld path that is disposed on the top surface of the first workpiece comprises a weld path that includes the portion of the first workpiece that is overlapped onto the portion of the second workpiece.

6. The method of claim 1, further comprising applying a compressive load to the first and second workpieces prior to controlling the laser welder to traverse the desired weld path.

7. The method of claim 1, wherein the second power level associated with the second laser beam is less than the first power level associated with the first laser beam.

8. The method of claim 1, wherein the second power level associated with the second laser beam is selected to change the second workpiece from the solid state to the molten state and avoid vaporization of the second workpiece.

9. The method of claim 1, wherein the second workpiece comprises a plurality of copper foils disposed in a stacked arrangement, wherein the foils sheets comprise battery electrodes.

10. An apparatus for joining first and second metallic workpieces, wherein the first and second metallic workpieces are configured as foils, and wherein the first metallic workpiece includes a top surface and a bottom surface, the apparatus comprising:
 a laser welder; and
 a controller, wherein the controller is operably connected to the laser welder;
 wherein the first and second metallic workpieces are arranged in a stack and positioned such that a portion of the first metallic workpiece overlaps a portion of the second metallic workpiece;
 wherein the controller is configured to control the laser welder to generate a first laser beam and coincidently control the laser welder to traverse a desired weld path that is disposed on the top surface of the first metallic workpiece;
 wherein the controller is configured to control the laser welder to generate a second laser beam and coincidently control the laser welder to traverse the desired weld path that is disposed on the top surface of the first metallic workpiece;
 wherein the first laser beam includes the laser welder being operated at a pulsed operation and at a first power level, wherein the first power level is selected to change the first workpiece from a solid state to a molten state to change a level of reflectivity of the top surface of the first workpiece without vaporing the first workpiece;
 wherein the laser welder being operated at a duty cycle and a power level to change the first workpiece from the solid state to the molten state to change the level of reflectivity of the top surface of the first metallic workpiece comprises the laser welder being operated at a duty cycle and a power level that are determined based upon a level of absorptivity of the top surface of the first metallic workpiece; and
 wherein the second laser beam includes the laser welder being operated at a continuous operation and at a second power level, wherein the second power level is selected to change the first and second workpieces to molten states.

11. The apparatus of claim 10, comprising the controller configured to control the laser welder to generate the first laser beam to have a focal point that is disposed beneath the top surface of the first metallic workpiece.

12. The apparatus of claim 10, wherein the laser welder being operated at a duty cycle and a power level that are determined to change a level of reflectivity of the top surface of the first metallic workpiece comprises the laser welder being operated at a power of 4200 W and 50% duty cycle when the first metallic workpiece is fabricated from copper.

13. The apparatus of claim 10, wherein the desired weld path that is disposed on the top surface of the first metallic workpiece comprises a weld path that includes the portion of the first metallic workpiece that is overlapped onto the portion of the second metallic workpiece.

14. The apparatus of claim 10, further comprising a welding system disposed to apply a compressive load to the first and second metallic workpieces prior to controlling the laser welder to traverse the desired weld path.

15. The apparatus of claim 10, wherein the second power level associated with the second laser beam is less than the first power level associated with the first laser beam.

16. The apparatus of claim 10, wherein the second power level associated with the second laser beam is selected to change the second workpiece from the solid state to the molten state and avoid vaporization of the second metallic workpiece.

17. The apparatus of claim 10, wherein the second metallic workpiece comprises a plurality of copper foils disposed in a stacked arrangement, wherein the copper foils comprise battery electrodes.

18. An apparatus for joining first and second metallic workpieces, wherein the first and second metallic workpieces are configured as foils, and wherein the first metallic workpiece includes a top surface and a bottom surface, the apparatus comprising:
 a laser welder; and
 a controller, wherein the controller is operably connected to the laser welder;
 wherein the first and second metallic workpieces are arranged in a stack and positioned such that a portion of the first metallic workpiece overlaps a portion of the second metallic workpiece;
 wherein the controller is configured to control the laser welder to generate a first laser beam and coincidently control the laser welder to traverse a desired weld path that is disposed on the top surface of the first metallic workpiece;
 wherein the controller is configured to control the laser welder to generate a second laser beam and coincidently control the laser welder to traverse the desired weld path that is disposed on the top surface of the first metallic workpiece;
 wherein the first laser beam includes the laser welder being operated at a pulsed operation and at a first power level, wherein the first power level is selected to change the first workpiece from a solid state to a molten state to change a level of reflectivity of the top surface of the first workpiece without vaporing the first workpiece, including the laser welder being operated at a power of 4200 W and 50% duty cycle when the first metallic workpiece is fabricated from copper; and
 wherein the second laser beam includes the laser welder being operated at a continuous operation and at a second power level, wherein the second power level is selected to change the first and second workpieces to molten states.

\* \* \* \* \*